(No Model.)
W. HARRISON.
COUNTER PRESSURE FLUID BEARING.
No. 506,779. Patented Oct. 17, 1893.
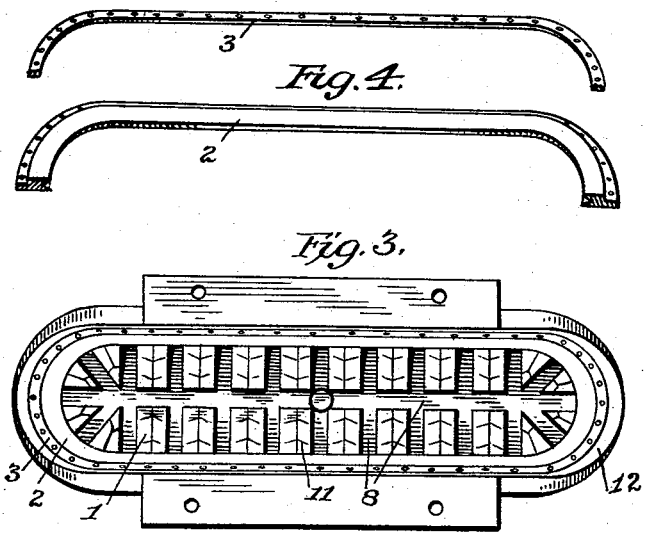
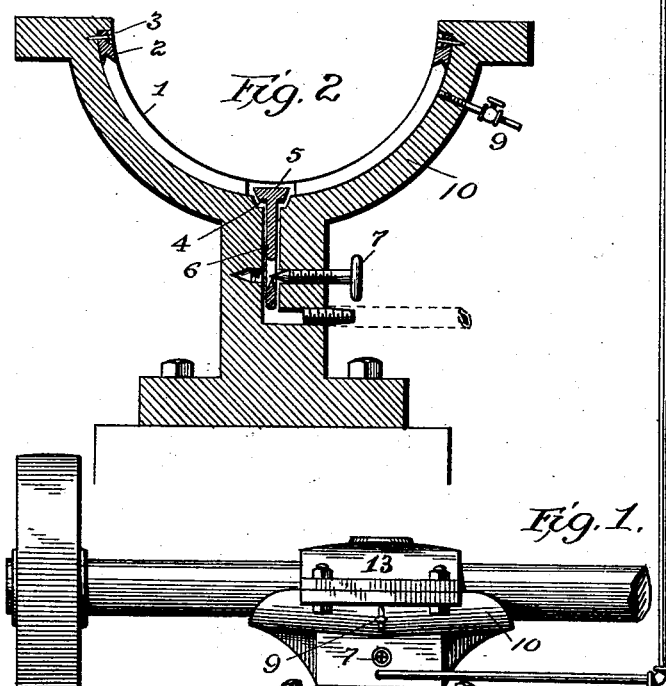
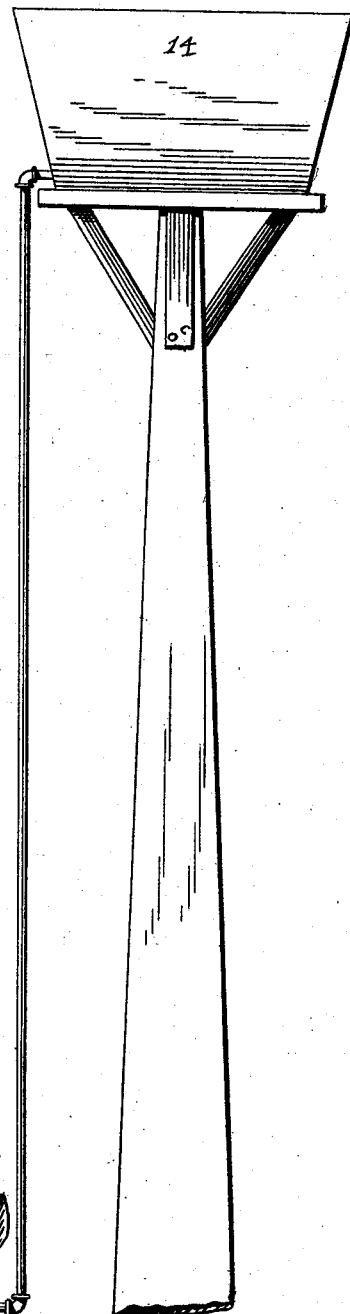
Attest:
J. M. Harrison
C. L. Harrison
Inventor:
Walton Harrison.

UNITED STATES PATENT OFFICE.

WALTON HARRISON, OF MERIDIAN, MISSISSIPPI.

COUNTER-PRESSURE FLUID BEARING.

SPECIFICATION forming part of Letters Patent No. 506,779, dated October 17, 1893.

Application filed December 29, 1892. Serial No. 456,680. (No model.)

*To all whom it may concern:*

Be it known that I, WALTON HARRISON, a citizen of the United States, residing at Meridian, in the county of Lauderdale and State of Mississippi, living temporarily in the city of Washington, in the District of Columbia, have invented certain new and useful Improvements in Counter-Pressure Fluid-Bearings; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to journal-bearings, the object being to relieve friction.

In the accompanying drawings, like numbers indicate like parts.

Figure 1. shows a perspective of the mechanism in use, 13 being an ordinary bearing, 10 my improved fluid-bearing, and 14 being a tank supplying fluid to the said fluid bearing. The tank is elevated a sufficient distance to cause gravitation to convey the liquid into the bearing, and to make it exert a hydrostatic pressure therein. In this instance the fluid-bearing is located beneath the shaft, as the working-pressure, incidental to the use of the pulley shown, and to the added weight of the shaft, is downward. The object is, to make the fluid-bearing comprise as nearly as possible, the seat of working-pressure, so as to remedy the friction there concentrated. Fig. 2. shows an enlarged cross section, representing the fluid-bearing as cut in two by a plane passing through its center, at right angles with the axis of the shaft. Fig. 3. is a plan view of the fluid bearing, the shaft and other pieces being removed. Fig. 4. shows the packing 2, used to make the bearing fluid tight, and the fastening 3, for securing said packing to the bearing-shell (10).

As the tank, shaft, common bearing and several other parts are individually in everyday use, they need no detailed description. Neither is it deemed necessary to explain any abstract physical principles involved, nor to set forth the difference in character between hydrostatic pressure and capillary fluid-pressure, as these things are understood by persons skilled in the arts. I therefore merely point out the details of the new part, as shown in Figs. 1, 2, and 3. The bearing, as shown in Figs. 1, 2 and 3, has a face oval in general outline, segmental in cross-section, and intersected by a net work of channels. This face is circumscribed by an automatic valvular packing, 2, described below, by means of which (with the shaft in position) a fluid-tight catacomb is formed between the shaft and bearing. Fluid under pressure being admitted into the channels, 8, it is forced within the reach of capillary attraction, and thereby drawn between the metallic bearing-face and the shaft, against which it exerts its capillary pressure. The bearing being so located as to comprise approximately the seat of working-pressure, and a microscopic play being allowed by a delicate adjustment of the bolts, it is clear that the working pressure can be thus resisted by the joint action of hydrostatic pressure exerted from the channels 8, and capillary pressure from the metallic bearers, 1.

The intended capillary surface is rendered more effectual by the following method: It is intersected by minute ducts 11, differing in character from the aforesaid channels in that the fluid is retained in and conveyed through said ducts principally by the agency of capillary attraction, and they act as capillary distributers from the channels to remote parts of the solid bearing-surface. Said capillary ducts have this advantage over the hydrostatic channels. If the bearing leaks, or the hydrostatic pressure waxes, it will affect them but slightly. The hydrostatic pressure in the channels has little to do with the capillary ducts, except to keep the fluid in constant contact with their several ends. The ducts do not exert hydrostatic pressure. What little pressure they exert is capillary in character. Their function is to act as capillary feeders. They facilitate the formation of capillary films or facets, between the solid bearers, and the shaft. The packing, 2, being composed of leather or other flexible material suitable for the purpose, is secured to the solid shell, 10, and sunken therein, as shown, so that its upper surface will be flush with the shaft. This packing is of peculiar form. Not only is it oval and partly cut away to allow for countersinking its fastening, but it is made thicker at the ends of the bearing, as shown in Figs. 2, 4, said thickness tapering from maximum at the points where the packing is represented as cut, to minimum at the points where the curvature ceases. To allow for said extra thickness at the ends, the groove in which the packing is located is made of proper depth to correspond. The object of this differential thickness in the packing is to take up differential play of the shaft, accordingly as said play is direct or tangential. The packing, apart from its fastenings, is of uniform thickness in cross-section at any given part of its perimeter; that is, if its substance at any given point be cut asunder by the shortest line, the inner edge of the oval is of the same thickness as the outer edge, though both edges taper in thickness at the ends of the bearing, as above stated. The object of this uniformity in thickness is to prevent unnecessary binding of the packing. The inner edge of the packing is grooved longitudinally, as shown in Fig. 4, so as to admit the liquid into the interior of the packing, and also to obtain the advantage of reliability due to thickness, and pliability due to thinness.

The object in making the packing of oval perimeter is to secure the maximum fluid-pressure effect obtainable from a given area, and to shorten the line through which leakage can occur. I learn from geometrical calculation that the theoretical lifting power of a given area of fluid under pressure applied laterally from a concave segmental surface against a cylinder, reaches its maximum if said area approximates an oval shape, and that this shape likewise gives the shortest proportional line across which leakage can occur. Of course the same effects can be produced by any form which deviates from a circle or a rectangle for the purposes designated. An endless concave oval fastening, 3, holds the packing in place. It is of sheet metal, is segmental in cross-section, and is countersunk in the leather packing. Said fastening is held in place by screws, the heads of which are countersunk, and the stems of which extend through said fastening, and engage the solid shell, as shown. This fastening prevents misplacement of the packing by movements of the shaft. The metallic bearers or lugs, 1, curve so as to conform to the shape of the shaft, thus forming a semi-cylinder. These lugs, or bearers, strengthen the bearing, in that they prevent too much stress being thrown upon the guide rims, 12, in consequence of jolts and other excessive working-pressures. The ducts, 11, mentioned above, are cut into the lugs, or bearers, and need not be of greater diameter than a horse hair. They communicate with the channels, 8, and are, like the said channels, circumscribed by the packing.

At 9 is a microscopic discharge, which prevents sediment from accumulating in the bearing, and has other obvious uses. The puppet-valve, 5, having the stem, 6, provided with an eye and integral therewith, is tightly fitted with a flat elastic ring, 4, which serves as a packing and is practically an integral part of the valve. The valve rests in a countersunken valve-seat having the shape of an inverted cone-frustum, the bottom of which seat is of slightly larger diameter than the elastic collar, so as to allow free play of the valve. The valve-stem extends downward, and is made slightly smaller than the orifice in which it plays. The valve is normally closed by its own weight, is adapted to open upward by the hydrostatic pressure from the reservoir 14, and to close downward in consequence of retrogradation of fluid from excessive shaft pressure upon the fluid bearing-face. The function of this valve is local, and independent of the action of any pump valves which may be used. An adjustment is provided for the valve. The hand-wheel operates a conical screw integral therewith, which causes the conical screw-point to engage the bottom of the eye in the valve-stem. By turning the hand-wheel 7 the screw-point is forced a greater or less distance into the eye, thus contracting, to any desired degree, the amount of play of the valve. By means of this mechanism the action of the valve can be made so sensitive that the retrogradation of a very minute volume of liquid will suffice to close it. This delicacy of adjustment is important, because a microscopic movement of the shaft should suffice to tighten the valve, if open when a jolt occurs.

The general operation of the bearing is as follows: The tank being filled with water or other appropriate lubricant, the pipe is filled and the liquid enters the bearing. Here it encounters the fluid-tight packing, which, being valvular, prevents the escape of the fluid. An infinitesimal play being allowed by a delicate adjustment of the bolts, which are used as in ordinary bearings, the shaft is raised a microscopic but definite distance by the combined force of hydrostatic pressure existing in the channels and the aforesaid capillary pressure incidental to the formation and maintenance of the capillary films between the shaft and metallic bearers. Any adhesion between shaft and packing cannot cause misplacement of the latter by rotation of the former, and the slight shaft play allowed is taken up by the differential thickness of the packing, and by the adaptability of the free or movable portions of the packing to conform to varying environment. Normally the shaft is not in contact with the metallic portions of the shell, except where it touches unavoidably and incidentally, but is in perpetual contact with the packing face at every point. The shaft is supported against the working-pressure by a fluid surface which may be compared with a semi-cylindrical window, the wooden parts representing the hydrostatic channels, the glass panes the capillary films, and the frame the packing. When a jolt occurs, or when the working pressure increases, the shaft is driven more forcibly against the fluid surface, and has a tendency to force the liquid out. This closes the adjustable and automatic puppet-valve, and the jolt is resisted by the incompressibility of the liquid, aided by the capillary pressure. When the puppet valve fails to close quickly enough, the shock will be sustained upon the metallic bearers and guide-rims, the latter being thereby protected. In cases where the working-pressure is irregular, intermittent or transitory, as in the main shaft of a steam-engine, I recommend that two such fluid bearings be used in juxta-position, and that the shaft play be reduced to a minimum, say one three-hundredths of an inch. The hydrostatic channels should be reduced in size, and the fluid bearings so located as to buff as much of the working pressure as possible. In such cases the capillary fluid pressures, in opposing the working pressure, also incidentally oppose each other somewhat, but the bearing which at any instant receives the pitman-thrust will invariably exert more capillary pressure than its fellow-bearing, its capillary films being momentarily thinner. The microscopic discharges should be open.

Having described my invention, what I claim as new, and desire to secure by Letters Patent, is as follows:

1. A lubricating journal box, comprising a series of separate bearers, each of which is provided with minute channels to afford capillary pressure.

2. A lubricating journal box, comprising a series of separate bearers, each of which is provided with minute channels to afford capillary pressure, in combination with suitable means for supplementing said capillary pressure by hydrostatic pressure.

3. A journal box, comprising a hydrostatic receptacle, a number of metallic bearers, and a packing circumscribing said receptacle and bearers, as and for the purposes set forth.

4. In a lubricating device, a number of separate bearers provided with capillary ducts, a packing circumscribing the same, and a fluid supply communicating with said capillary ducts, substantially as described.

5. A lubricating journal box, comprising a hollow receptacle to afford hydrostatic pressure, metallic bearers provided with minute channels to afford capillary pressure, and a packing circumscribing said receptacle and bearers, as and for the purposes set forth.

6. A lubricating journal box provided with a series of minute channels to afford capillary pressure.

7. In a lubricating device, an endless packing gradually tapering in general thickness, in combination with a shaft, a bearing and a fluid supply; whereby different degrees of thickness in said packing correspond to different degress of shaft-play, accordingly as said shaft-play may be direct or tangential, substantially as described.

8. The method, herein described, of resisting shaft-pressure; which method consists in cushioning the shaft-pressure by a contrary fluid-pressure involving the action of hydrostatic pressure and capillary pressure.

9. In a fluid-bearing, a fluid-seat segmental in cross-section and approximating an oval in general outline, as distinguished from a rectangular or a circular form; whereby the fluid area is located to better advantage in the path of lateral working-pressure, as and for the purposes set forth.

10. In a counter-pressure lubricating apparatus, the combination of a bearing-face provided with capillary ducts, a packing circumscribing the same, and a hydrostatic supply communicating with said bearing-face, as and for the purposes set forth.

11. In a lubricating device, the combination of a bearing-surface provided with capillary ducts, a fluid supply communicating with said bearing-surface, and a packing so located as to intersect the fluid's path of exit from said bearing-surface, substantially as described.

12. In a bearing, the combination of a metallic bearing-surface, a hydrostatic bearing-surface, capillary ducts for lubricating said metallic bearing-surface, and a packing circumscribing said hydrostatic bearing-surface, as and for the purposes set forth.

In testimony whereof I affix my signature in presence of two witnesses.

WALTON HARRISON.

Witnesses:
J. M. HARRISON,
C. L. HARRISON.